United States Patent
Ito et al.

(10) Patent No.: US 7,537,098 B2
(45) Date of Patent: May 26, 2009

(54) ELECTROMAGNETIC CLUTCH

(75) Inventors: Shigeru Ito, Isesaki (JP); Hirokazu Ichinose, Isesaki (JP); Motoaki Yoshida, Isesaki (JP); Isamu Shirai, Isesaki (JP)

(73) Assignee: Sanden Corporation, Gunma (JP)

( * ) Notice: Subject to any disclaimer, the term of this patent is extended or adjusted under 35 U.S.C. 154(b) by 343 days.

(21) Appl. No.: 10/565,737

(22) PCT Filed: Jul. 23, 2004

(86) PCT No.: PCT/JP2004/010491
§ 371 (c)(1),
(2), (4) Date: Jan. 24, 2006

(87) PCT Pub. No.: WO2005/010392
PCT Pub. Date: Feb. 3, 2005

(65) Prior Publication Data
US 2006/0191765 A1 Aug. 31, 2006

(30) Foreign Application Priority Data
Jul. 24, 2003 (JP) ............................... 2003-201322

(51) Int. Cl.
*F16D 27/04* (2006.01)
(52) U.S. Cl. .................. 192/84.94; 192/70.18; 192/200
(58) Field of Classification Search .............. 192/70.18, 192/84, 94, 84.961, 200, 84.94
See application file for complete search history.

(56) References Cited

U.S. PATENT DOCUMENTS

| 5,046,594 A | | 9/1991 | Kakinuma | |
|---|---|---|---|---|
| 5,154,669 A | * | 10/1992 | Weiss et al. | 464/69 |
| 5,667,050 A | * | 9/1997 | Hasegawa | 192/84.961 |
| 6,578,687 B2 | * | 6/2003 | Dau et al. | 192/70.18 |
| 6,702,082 B2 | * | 3/2004 | Dorfler et al. | 192/70.18 |
| 2002/0070089 A1 | | 6/2002 | Dorfler et al. | |

FOREIGN PATENT DOCUMENTS

| CN | 1052726 A | 7/1991 |
|---|---|---|
| EP | 0422528 A1 | 4/1991 |

(Continued)

OTHER PUBLICATIONS

International Search Report mailed Nov. 2, 2004.

(Continued)

*Primary Examiner*—Charles A Marmor
*Assistant Examiner*—Derek D Knight
(74) *Attorney, Agent, or Firm*—Baker Botts L.L.P.

(57) ABSTRACT

An electromagnetic clutch (20) capable of connecting and disconnecting a driving power source and a rotary shaft (22) includes a rotor (25) rotated by the driving power source, and an armature (40) capable of being attracted to the rotor (25) by electromagnetic force to produce a transmission force transmitted from the rotor (25) to the rotary shaft (22). The electromagnetic clutch (20) further includes leaf springs (52) urging the armature (40) in such a direction as to separate the armature from the rotor (25). The leaf springs (52) each assume an orientation such that a boost force assisting the attractive force acting upon the armature (40) is produced based on the transmission force when the armature (40) is attracted to the rotor (40).

2 Claims, 11 Drawing Sheets

FOREIGN PATENT DOCUMENTS

| | | |
|---|---|---|
| JP | 58187627 | 11/1983 |
| JP | 6037423 | 2/1985 |
| JP | 735830 | 7/1995 |
| JP | 112266 | 1/1999 |
| JP | 200156033 | 2/2001 |

OTHER PUBLICATIONS

European Patent Office, Communication Pursuant to Article 96(2) EPC, Related European Application No. 04747877.1 dated Nov. 2, 2006.

* cited by examiner

ELECTROMAGNETIC CLUTCH

TECHNICAL FIELD

The present invention relates to electromagnetic clutches, and more particularly, to an electromagnetic clutch suited for use with a compressor of an automotive air-conditioning system.

BACKGROUND ART

This type of electromagnetic clutch is suitable for a compressor of an automotive air-conditioning system and is capable of intermittently transmitting the driving force of an engine to the drive shaft of the compressor. A conventional electromagnetic clutch disclosed in Unexamined Japanese Utility Model Publication No. H07-35830, for example, has a rotor rotatably supported on one end portion of a compressor housing. A driving belt is passed around the rotor and a pulley of the engine, and the rotor has an electromagnetic coil therein. The coil is arranged inside a stator and serves as an electromagnetic force generator. An armature in an annular plate like shape, as a clutch plate, is coupled to the drive shaft of the compressor through a coupler in a manner such that the armature is allowed to be attracted to the rotor by the electromagnetic force produced by the electromagnetic force generator. More specifically, the coupler has a hub fitted around the drive shaft of the compressor, and part of the hub projects from the aforementioned end portion of the housing. A flange extends integrally from the projecting part of the hub, and the armature is supported by the flange through a plurality of leaf springs and located coaxially with the rotor. The leaf springs constantly urge the armature in a direction away from the rotor, and accordingly, when the electromagnetic coil is not excited, the armature is kept separated from the rotor with a predetermined gap therebetween. On the other hand, when the electromagnetic coil is excited, the armature is attracted to the rotor by the electromagnetic force of the electromagnetic force generator against the forces of the leaf springs and is pressed against the rotor with a predetermined surface contact pressure corresponding to the attractive force. If, at this time, the rotor is being rotated by the driving belt, the armature is dragged and rotated with the rotor, whereby the drive shaft of the compressor is rotated through the leaf springs, the flange, and the hub.

In the conventional electromagnetic clutch, the surface contact pressure acting between the armature and the rotor is given solely by the electromagnetic force produced by the electromagnetic force generator, that is, the electromagnetic coil, as stated above. Accordingly, in order to increase the torque transmitted to the drive shaft of the compressor, measures need to be taken to increase the size of the electromagnetic coil and of the rotor or to supply more electric power to the electromagnetic coil.

Increasing the torque by these measures, however, hinders reduction in weight of the electromagnetic clutch as well as in electric power consumption. Also, increase in size of the electromagnetic coil leads to increase of the self-inductance, and thus, when the supply of electric power to the electromagnetic coil is stopped, the armature cannot be readily separated from the rotor. As a result, a loud noise is produced when the armature separates from the rotor. On the other hand, when the power supply to the electromagnetic coil is started, the armature is synchronized with the rotating rotor in a short period of time because of the increased electromagnetic force. Accordingly, the torque of the rotor is transmitted to the armature as an impact force, with the result that high load instantaneously acts upon not only the parts constituting the clutch but the parts constituting the compressor.

DISCLOSURE OF THE INVENTION

An object of the present invention is to provide an electromagnetic clutch which utilizes the resilient forces of leaf springs due to the compression of the leaf springs as the coupling force between an armature and a rotor, thereby making it possible to reduce magnetomotive force required of an electromagnetic coil.

To achieve the object, there is provided an electromagnetic clutch capable of connecting and disconnecting a driving power source and a rotary shaft, the clutch comprising: a rotor arranged around the rotary shaft coaxially therewith and adapted to be rotated by the driving power source; an electromagnetic force generator including an electromagnetic coil arranged inside the rotor, the electromagnetic force generator producing an electromagnetic force when the electromagnetic coil is energized; an armature arranged close to the rotor and capable of being attracted to the rotor by the electromagnetic force to produce a transmission force transmitted from the rotor to the rotary shaft; and a coupler coupling the armature and the rotary shaft to each other, the coupler including a connecting member coupled to the rotary shaft, and leaf springs coupling the connecting member and the armature to each other and urging the armature in such a direction as to separate the armature from the rotor, wherein the leaf springs each assume an orientation such that a boost force assisting an attractive force acting on the armature is produced based on the transmission force when the armature is attracted to the rotor.

Specifically, each leaf spring has inner and outer ends as viewed in a radial direction of the armature. The inner end is located more forward than the outer end, as viewed in a rotating direction of the armature, and is separated farther from the armature than the outer end.

With this arrangement, while torque is transmitted with the rotor and the armature coupled to each other, the boost force is produced due to the orientation of the leaf springs, more specifically, the shape and arrangement of the springs, and the boost force adds to the attractive force with which the armature is attracted to the rotor. The boost force increases the surface contact pressure acting between the armature and the rotor, thus permitting greater torque to be transmitted from the rotor to the armature without the need to increase the size of the electromagnetic coil and of the rotor or to supply more electric power to the electromagnetic coil. Where such increase of the torque is unnecessary, then it is possible to reduce the size of the electromagnetic coil and of the rotor, the number of turns of the coil, or the electric power supplied to the electromagnetic coil. Accordingly, the electromagnetic clutch can be reduced in weight as well as in electric power consumption, compared with the conventional electromagnetic clutch.

Also, with the above arrangement, the increase of the torque does not entail increase in self-inductance of the electromagnetic coil, and therefore, when the power supply to the electromagnetic coil is stopped, the armature readily separates from the rotor. Consequently, no loud noise is produced at the time of separation of the armature from the rotor. Further, the increase of the torque does not entail increase of the electromagnetic force, and accordingly, when the power supply to the electromagnetic coil is started, adequate time is needed for the armature to become synchronized with the rotating rotor. It is therefore possible to prevent the torque of the rotor from being transmitted as an impact force to the armature, whereby increase of the load applied to not only the parts constituting the electromagnetic clutch but those constituting the compressor is prevented.

Preferably, each leaf spring has an inclined portion inclined with respect to the armature, and the inclined portion is inclined at an angle falling within a range in which the armature is separable from the rotor when the electromagnetic coil is de-energized during rotation of the armature together with the rotor.

With this arrangement, the inclination angle of the inclined portions of the leaf springs is set to fall within the given range, in order to limit the magnitude of the boost force, whereby separation of the armature from the rotor is in no way hindered. Thus, the electromagnetic clutch can be reliably switched off.

Preferably, the connecting member has mounting portions to which the inner ends of the respective leaf springs are attached, and each mounting portion is inclined at an angle corresponding to the angle of inclination of the leaf springs. Also, the inner ends of the leaf springs are coupled to the respective mounting portions by caulking.

Also preferably, the inner end of each leaf spring is formed as a folded portion, and the folded portion clamps the corresponding mounting portion therein.

The connecting member preferably has mounting holes into which the inner ends of the respective leaf springs are inserted.

Also, the armature preferably has fixing holes into which the outer ends of the respective leaf springs are inserted.

BEST MODE OF CARRYING OUT THE INVENTION

Figure 1:
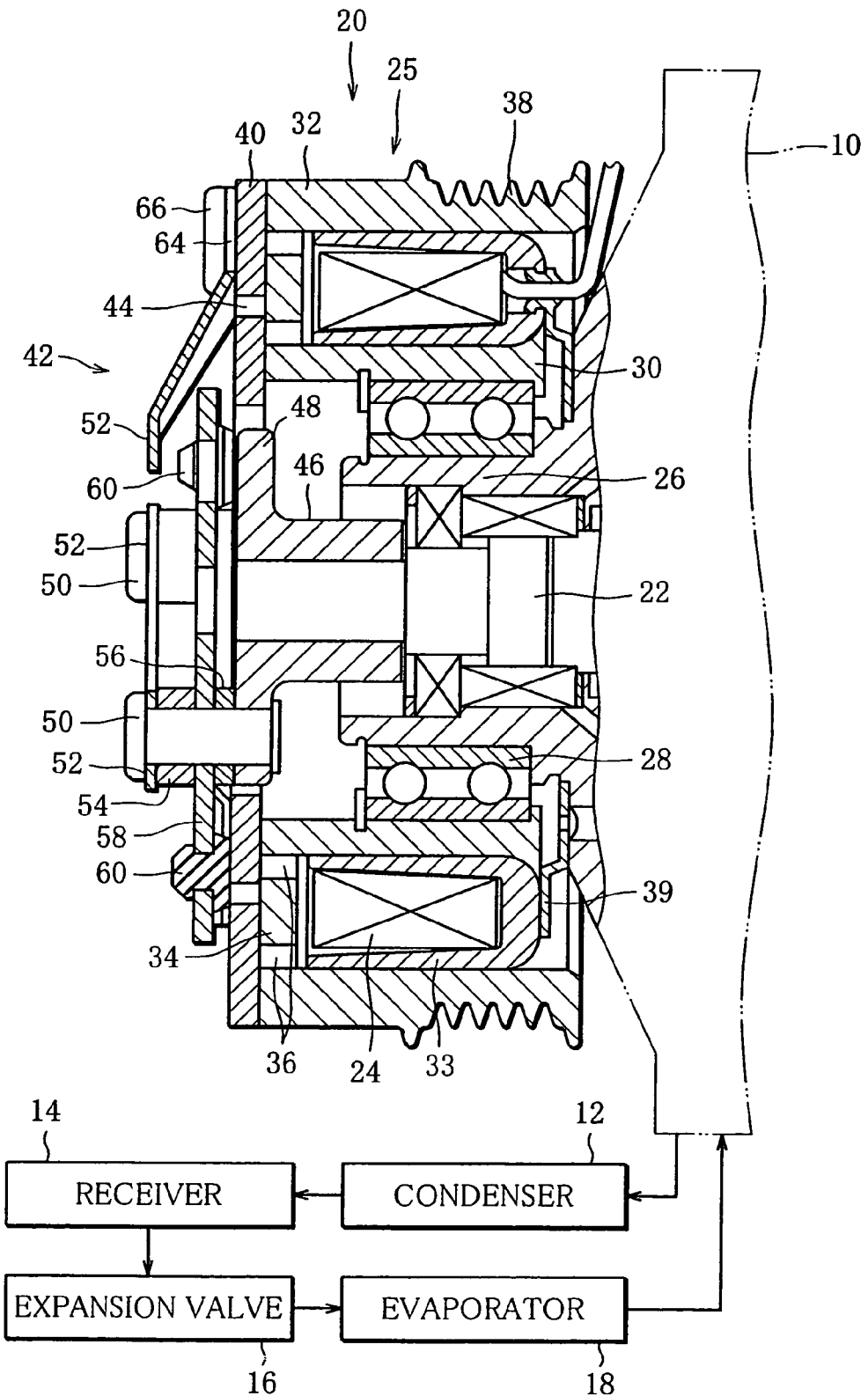
FIG. 1 is a longitudinal sectional view of an electromagnetic clutch of a first embodiment mounted to a compressor.

FIG. 1 shows a refrigeration circuit of an automotive air-conditioning system, and the refrigeration circuit has a refrigerant circulation line in which are arranged a compressor 10, a condenser 12, a receiver 14, an expansion valve 16 and an evaporator 18 in the order mentioned along the circulating direction of refrigerant. The compressor 10 is provided with an electromagnetic clutch 20 according to a first embodiment of the invention, and the driving force from an engine (not shown) is transmitted intermittently through the electromagnetic clutch 20 to a main shaft 22 of the compressor 10. As the main shaft 22 rotates, a compression unit (not shown) of the compressor 10 is driven, whereby the refrigerant circulates through the refrigeration circuit. The compressor 10 may be either a scroll compressor or a swash plate compressor.

The electromagnetic clutch 20 has a rotor 25 which is rotatably supported through a ball bearing 28 by an end portion 26 of the housing of the compressor 10. The main shaft 22 of the compressor 10 extends through the end portion 26 of the housing, and the rotor 25 is arranged around the main shaft 22 coaxially therewith. More specifically, the rotor 25 has inner and outer peripheral walls 30 and 32 coaxial with each other and connected together by an annular end wall 34 into a one-piece body. A plurality of slits 36 for cutting off magnetic flux are formed through the end wall 34 and extend at intervals in the circumferential direction of the end wall 34. A belt groove 38 is formed in the outer peripheral surface of the outer peripheral wall 32, and a driving belt (not shown), by means of which the driving force of the engine is transmitted, is passed around the belt groove 38.

A stator 33 is arranged between the inner and outer peripheral walls 30 and 32 of the rotor 25 and an electromagnetic coil 24 as an electromagnetic force generator is accommodated inside the stator 33. The stator 33 is fixed to the housing of the compressor 10 via an annular bracket 39. When the electromagnetic coil 24 is energized, the electromagnetic force generator produces an electromagnetic force by means of which the rotor 25 attracts an armature 40 thereto.

The armature 40 is an annular plate made of magnetic material such as an iron-based material. The armature 40 is arranged close to the end wall 34 of the rotor 25 coaxially therewith. More specifically, the armature 40 is supported by the main shaft 22 of the compressor 10 through a coupler 42 in such a manner that the armature 40 is allowed to move toward and away from the rotor 25, and is rotatable together with the main shaft 22. Namely, the armature 40 functions as a clutch plate. Also, slits 44 are formed through the armature 40 and extend at intervals in the circumferential direction of the armature 40.

The coupler 42 includes a flanged sleeve 46 made of metal. The sleeve 46 extends from the end portion 26 of the housing to the armature 40, and the main shaft 22 has an end portion screwed into the sleeve 46.

The flange 48 of the sleeve 46 is generally triangular in shape and is surrounded by the inner peripheral edge of the armature 40. Three rivets 50 are attached to the triangular flange 48 in the vicinity of the respective vertexes and project from the outer surface of the flange 48. Each rivet 50 has a distal end to which a leaf spring (plate spring) 52, described later, is attached, and has a shank portion which is located between the leaf spring 52 and the flange 48 and which penetrates through a thick spacer 54, a thin spacer 56, and a damping plate 58 of metal held between the thick and thin spacers 54 and 56. Namely, each rivet 50 connects together the leaf spring 52, the thick spacer 54, the damping plate 58, the thin spacer 56, and the flange 48.

The damping plate 58 has a generally triangular shape larger in size than the flange 48 and faces the outer surface of the flange 48 with the three thin spacers 56 therebetween. Three vibration isolators 60 of rubber are attached to the triangular damping plate 58 in the vicinity of the respective vertexes and are disposed in contact with the outer surface of the armature 40. The damping plate 58 and the rubber vibration isolators 60 serve to damp vibrations of the armature 40.

Figure 2:
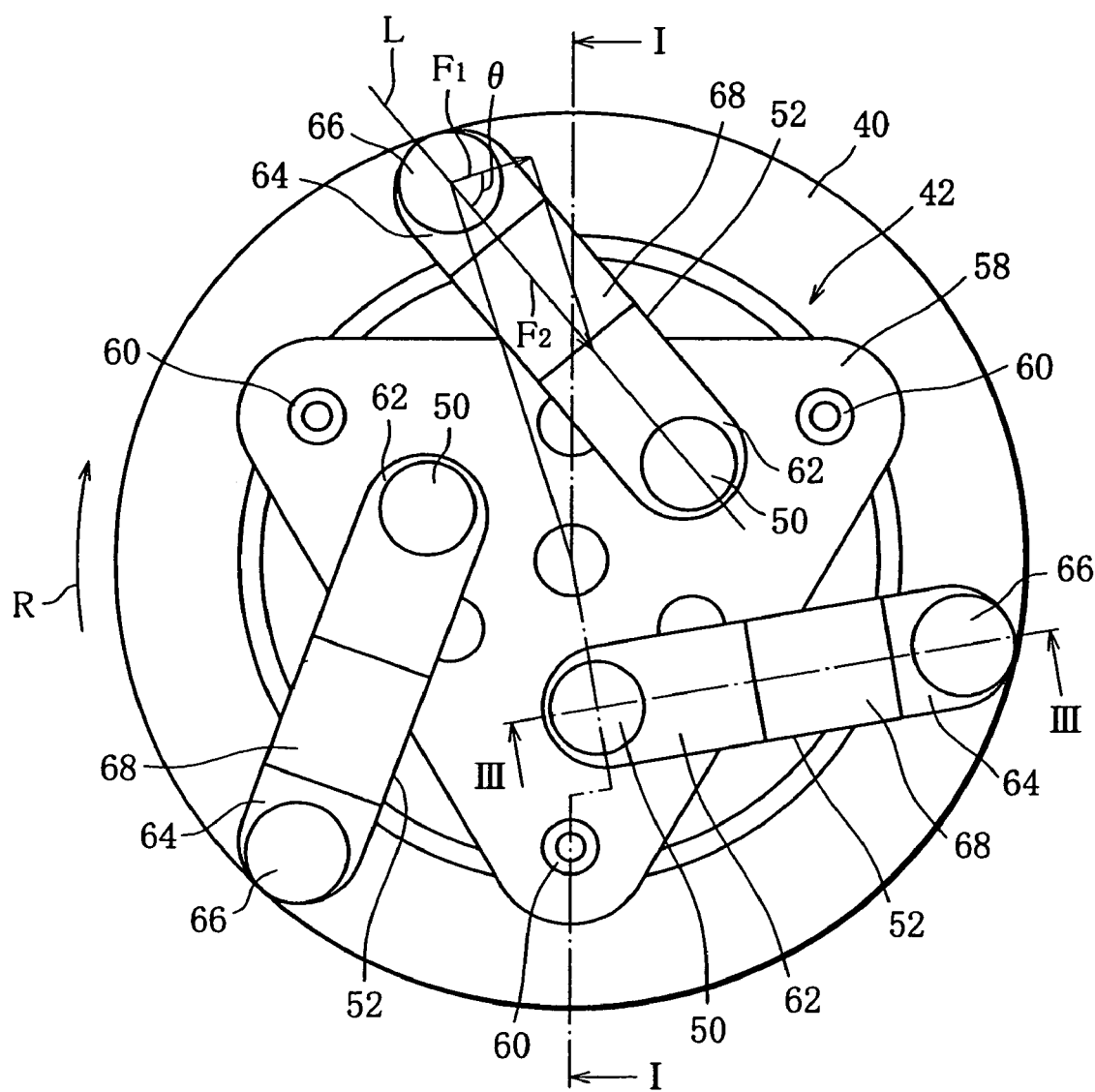
FIG. 2 is a front view of a coupler applied to the electromagnetic clutch of FIG. 1, showing a state of the coupler coupled to an armature.
Figure 3:
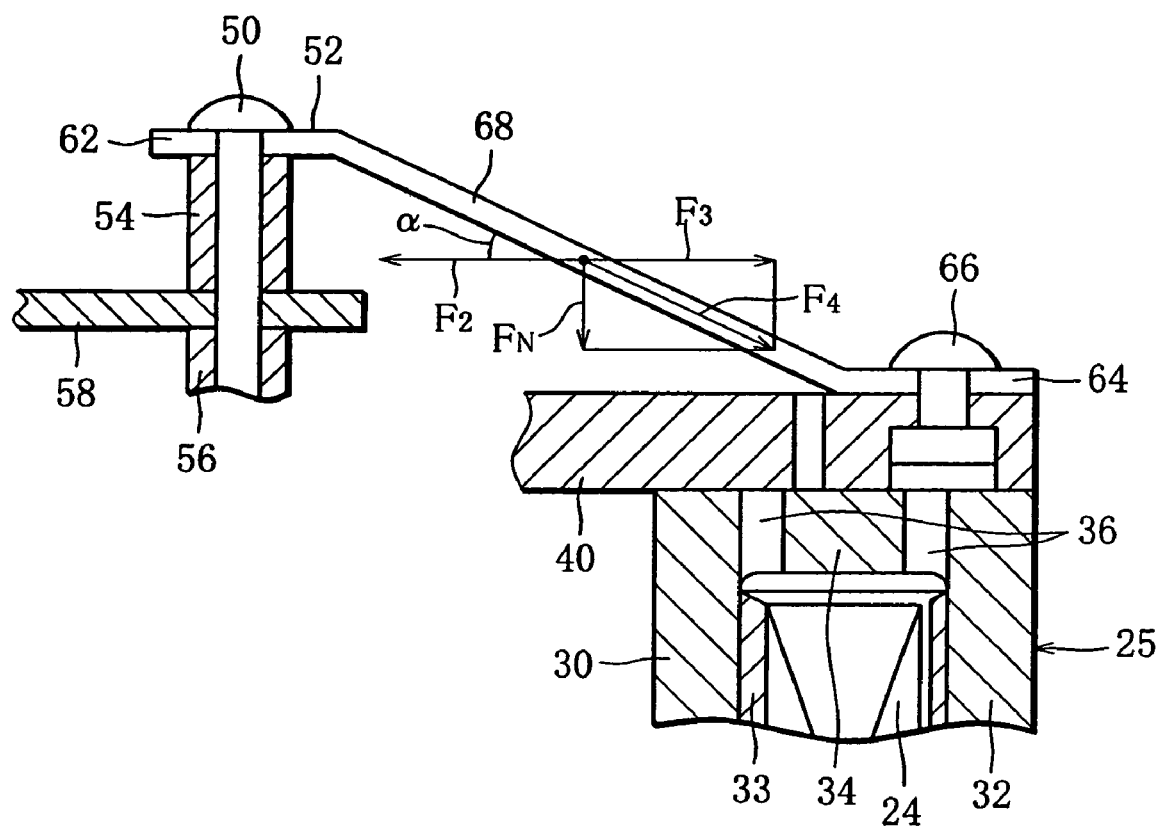
FIG. 3 illustrates the principle of generation of a boost force applied to the armature from a leaf spring shown in FIG. 2.

Each leaf spring 52 is made of an iron-based metal and, as shown in FIG. 2, is in the form of a strip rounded at opposite ends 62 and 64, as viewed from the front of the armature 40. The leaf spring 52 has inner and outer ends 62 and 64, as viewed in the radial direction of the armature 40. The inner end 62 is connected to the flange 48 by the corresponding rivet 50, and the outer end 64 is fixed to a portion of the armature 40 near the outer periphery thereof by a short rivet 66. Also, the leaf spring 52 has an axis L slanted with respect to the radial direction of the armature 40. Specifically, the inner end 62 of the leaf spring 52 is located more forward than the outer end 64 of same, as viewed in a rotating direction R of the armature 40. In other words, the rivet 50 is located more forward than the corresponding short rivet 66 as viewed in the rotating direction R. Also, as shown in FIG. 3, the inner and outer end portions 62 and 64 of the leaf spring 52 are parallel with the armature 40, but an intermediate portion between the inner and outer end portions 62 and 64 is formed as an inclined portion 68 inclined with respect to the outer surface of the armature 40. In FIG. 3, the leaf spring 52 is not hatched for Convenience' sake.

In the electromagnetic clutch 20 constructed as described above, while the electromagnetic coil 24 is de-energized, the armature 40 is kept separated from the rotor 25 by the urging forces of the leaf springs 52, and thus, the rotating force (torque) of the rotor 25 is not transmitted to the armature 40.

When the electromagnetic coil 24 is energized, the electromagnetic force generator produces an electromagnetic force, by means of which the armature 40 is attracted to the end wall 34 of the rotor 25 against the urging forces of the leaf springs 52, and thus the rotor 25 and the armature 40 are coupled to each other. More specifically, when the electromagnetic coil 24 is energized, magnetic flux passing through the stator 33, the rotor 25 and the armature 40 is generated, and the rotor 25 then acting as an electromagnet attracts the armature 40. Once the rotor 25 and the armature 40 are coupled to each other, the torque of the rotor 25 is transmitted to the armature 40 by friction, and the torque is then successively transmitted through the leaf springs 52, the rivets 50, the flange 48 and the sleeve 46 to the main shaft 22. As the main shaft 22 is rotated by the thus-transmitted force, the compressor 10 sequentially performs a refrigerant suction process and a refrigerant compression process.

While the torque is transmitted with the rotor 25 and the armature 40 of the electromagnetic clutch 20 coupled to each other, a boost force, described later, is produced due to the orientation of the leaf springs 52, that is, the shape and arrangement of the springs, and the boost force adds to the attractive force with which the rotor 25 attracts the armature 40. Because the boost force increases the surface contact pressure acting between the armature 40 and the rotor 25, it is possible to increase the torque to be transmitted from the rotor 25 to the armature 40 without the need to increase the size of the electromagnetic coil 24 and of the rotor 25 or to supply more electric power to the electromagnetic coil 24. Where such increase of the torque is unnecessary, then it is possible to reduce the size of the electromagnetic coil 24 and of the rotor 25, the number of turns of the coil, or the electric power supplied to the electromagnetic coil 24. Accordingly, the electromagnetic clutch 20 can be reduced in weight as well as in power consumption, compared with the conventional electromagnetic clutch.

Also, the aforesaid increase of the torque does not entail increase in self-inductance of the electromagnetic coil 24, and therefore, when the power supply to the electromagnetic coil 24 is stopped, the armature 40 readily separates from the rotor 25. Consequently, no loud noise is produced at the time of separation of the armature 40 from the rotor 25. Further, the increase of the torque does not entail increase of the electromagnetic force, and accordingly, when the power supply to the electromagnetic coil 24 is started, adequate time is needed for the armature 40 to become synchronized with the rotating rotor 25. It is therefore possible to prevent the torque of the rotor 25 from being transmitted as an impact force to the armature 40, whereby increase of the load applied to not only the parts constituting the electromagnetic clutch 20 but those constituting the compressor 10 is prevented.

The following explains how the aforementioned boost force is produced:

In the electromagnetic clutch 20, the inner end 62 of each leaf spring 52 is located more forward than the outer end 64 of same, as viewed in the rotating direction R. Accordingly, while torque is transmitted from the rotor 25 to the armature 40 with a force $F_1$ acting upon the short rivet 66, that is, the outer end 64 as shown in FIG. 2, a force $F_2$ acts upon the rivet 50, that is, the inner end 62. The magnitude of the force $F_2$ is expressed as $F_2 = F_1/\cos\theta$, where $\theta$ is the angle of intersection between the forces $F_1$ and $F_2$.

The intersection angle $\theta$ is smaller than 90°, and thus the force $F_2$ acts upon the leaf spring 52 as a compressive stress. Specifically, when the leaf spring 52 is applied with the force $F_2$ parallel to the outer surface of the armature 40, as shown in FIG. 3, a reaction force $F_3$ also acts upon the leaf spring 52, because the inner and outer ends 62 and 64 of the leaf spring 52 are immovably fixed. The inclined portion 68 is inclined to the armature 40, and accordingly, a reaction force $F_4$ containing the reaction force $F_3$ as a component acts on the leaf spring 52 in a direction parallel to the inclined portion 68. The reaction force $F_4$ can be decomposed into the reaction forces $F_3$ and $F_N$, and the reaction force $F_N$ acts as the aforementioned boost force upon the armature 40 in the axial direction thereof.

The magnitude of the reaction force $F_N$ is expressed as $F_N = F_2 \times \tan\alpha$, where $\alpha$ is the inclination angle of the inclined portion 68. Accordingly, the greater the inclination angle $\alpha$, in other words, the remoter the inner end 62 is from the outer end 64 in the axial direction of the armature 40, the stronger reaction force $F_N$ results. Also, since the reaction force $F_N$ is proportional to the reaction force $F_2$, the closer the intersection angle $\theta$ is to 90°, in other words, the nearer the radial position of the inner end 62 is to the center relative to the outer end 64, the stronger reaction force $F_N$ results.

If the reaction force $F_N$ is too strong, however, the armature 40 fails to be separated from the rotor 25 due to the friction between the armature 40 and the rotor 25 when the current supply to the electromagnetic coil 24 is stopped. To avoid such a situation, the electromagnetic clutch 20 is so constructed as to fulfill the relationship indicated by the following expression (1):

$$\mu \cdot (F_N - F_S) < F_1 \tag{1}$$

where $F_S$ is the urging force of the leaf spring 52, and $\mu$ is the coefficient of friction between the armature 40 and the rotor 25.

Specifically, the intersection angle $\theta$ and the inclination angle $\alpha$ of the inclined portion 68 are set so that the relationship of the expression (1) for which the equation (2) below is substituted may hold.

$$F_N = F_2 \cdot \tan\alpha \qquad (2)$$

$$= (F_1 / \cos\theta) \cdot \tan\alpha$$

More specifically, the intersection angle θ is preferably within the range of 0° to 85° (0°≦θ≦85°), more desirably, within the range of 0° to 80° (0°≦θ≦80°). The inclination angle α is preferably within the range of 3° to 63° (3°≦α≦63°), more desirably, within the range of 3° to 40° (3°≦α≦40°).

Figure 4:
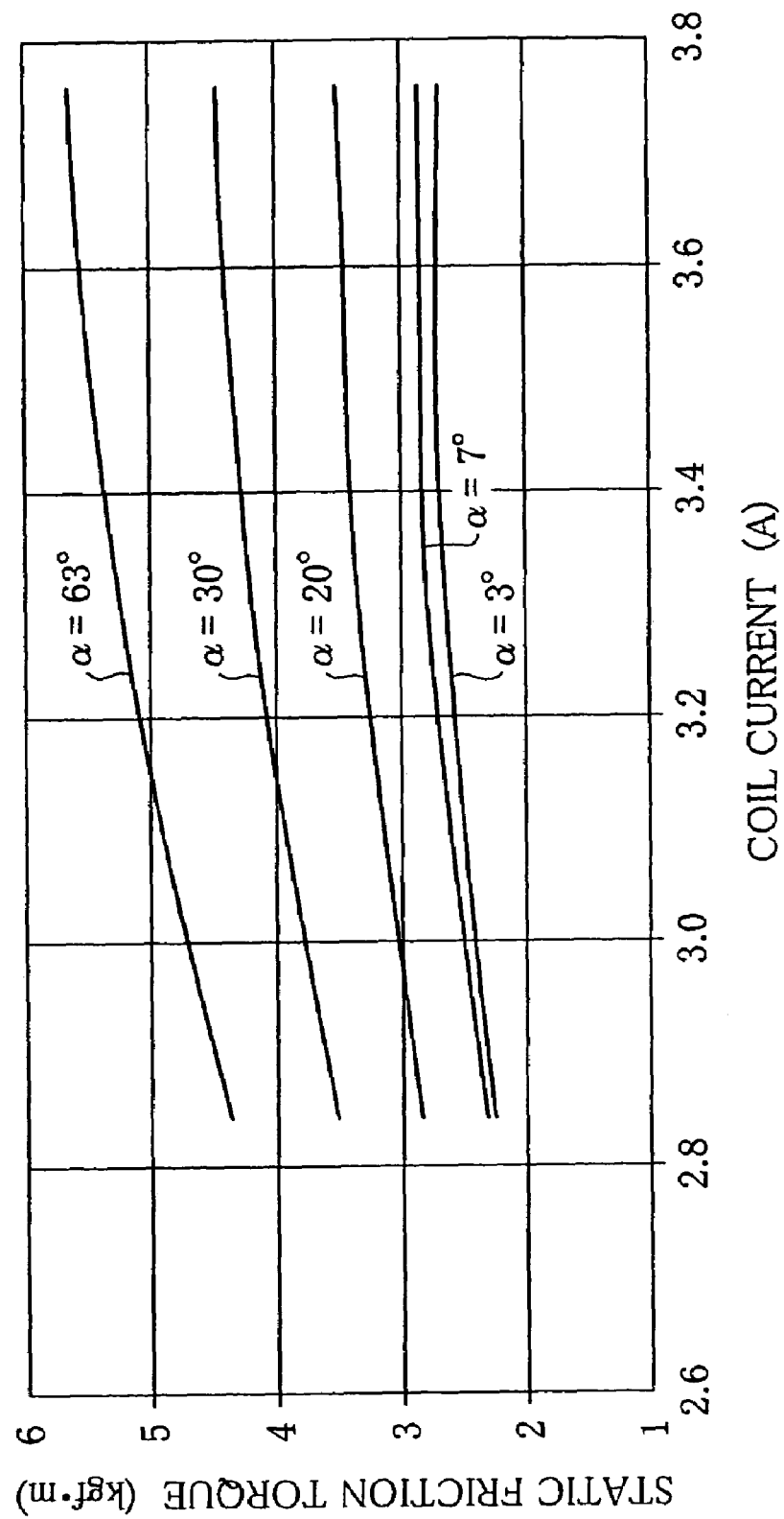
FIG. 4 is a graph showing the relationship between coil current supplied to an electromagnetic coil and static friction torque of the clutch.

The graph of FIG. 4 shows the static friction torque measurement results obtained using five electromagnetic clutches 20 with different inclination angles α but the same intersection angle θ (=112°), wherein the static friction torque was measured while varying the amount of electric current (coil current) supplied to the electromagnetic coil 24. The static friction torque is a maximum torque transmitted while the rotor 25 and the armature 40 are completely coupled to each other. The inclination angles α were 3°, 7°, 20°, 30°, and 63°.

FIG. 4 reveals that, for the same amount of current supply, the static friction torque increases with increase in the inclination angle α. Namely, the electromagnetic clutch 20 with a larger inclination angle α can provide greater static friction torque with a smaller amount of current supply.

The present invention is not limited to the foregoing embodiment and may be modified in various ways.

Figure 5:
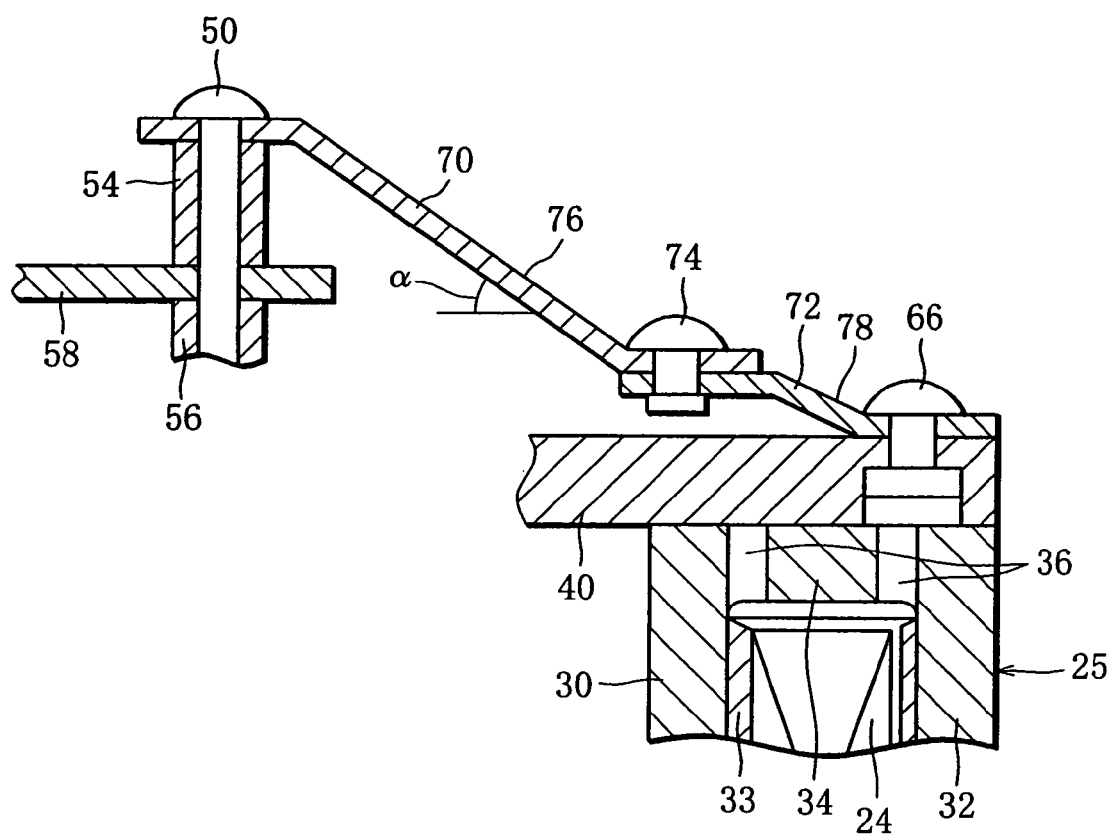
FIG. 5 is a sectional view showing a part of the electromagnetic clutch of FIG. 1 to which a leaf spring of a second embodiment is applied.

FIG. 5 shows a second embodiment of the invention, and as illustrated, each leaf spring 52 may be replaced by two leaf springs 70 and 72 connected in series by a short rivet 74. In the illustrated embodiment, both of the leaf springs 70 and 72 have inclined portions 76 and 78, respectively, but at least one of the two may have an inclined portion. Also, one of the two members 70 and 72 need not be a leaf spring and may be a rigid member.

Figure 6:
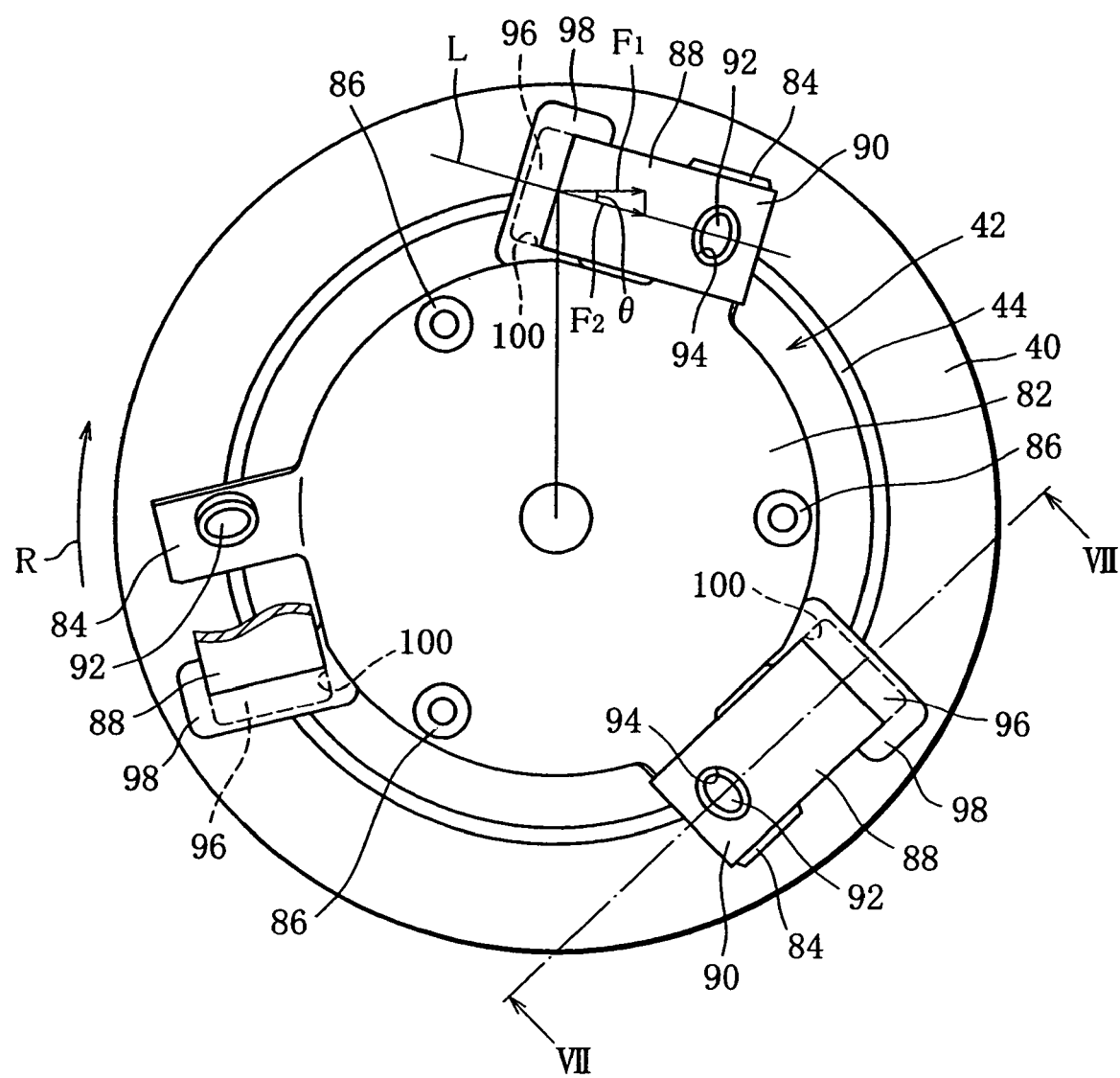
FIG. 6 is a front view of a coupler used in an electromagnetic clutch of a third embodiment, showing a state of the coupler coupled to the armature.
Figure 7:
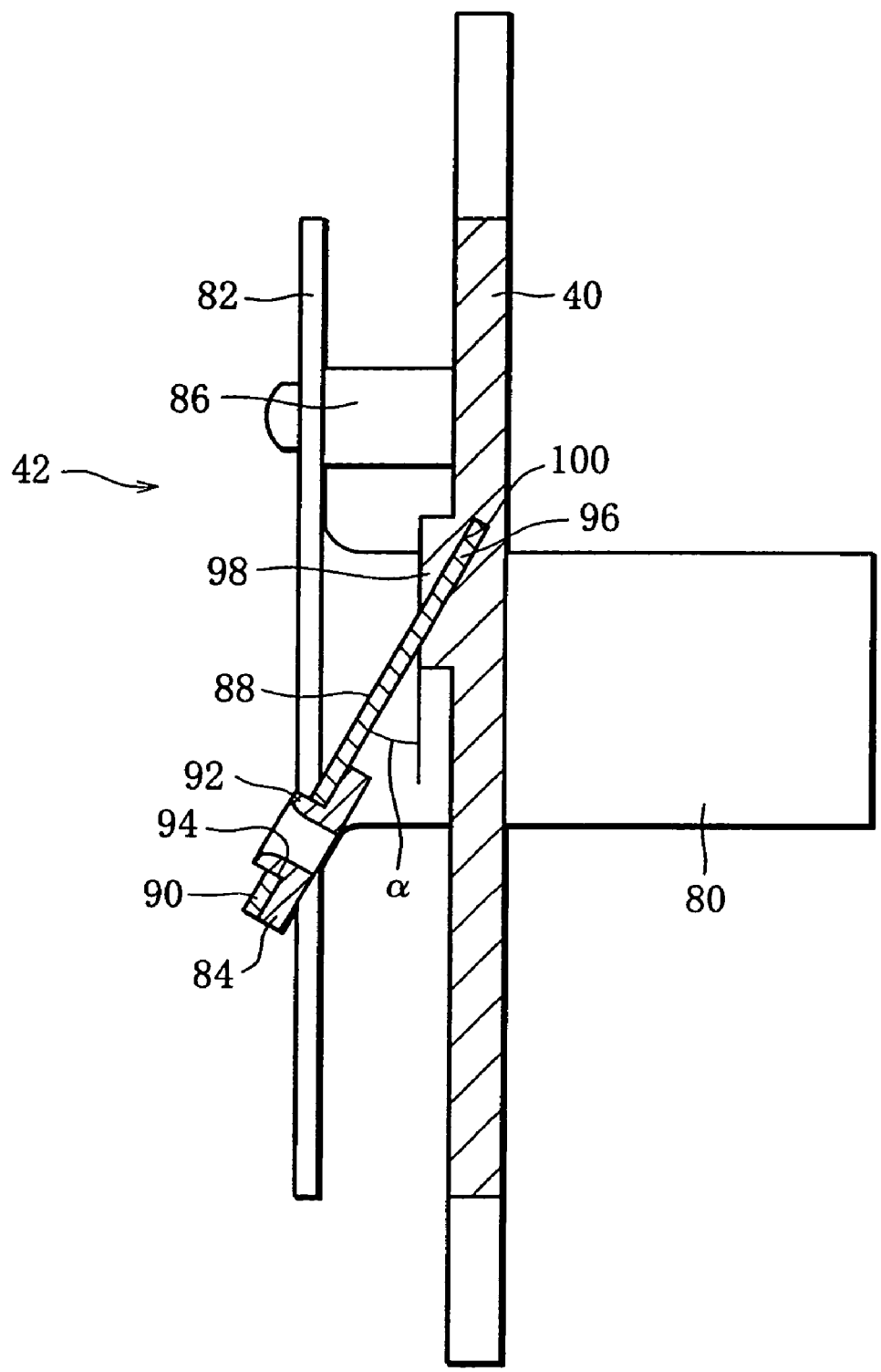
FIG. 7 is a sectional view taken along line VII-VII in FIG. 6.

FIGS. 6 and 7 illustrate a third embodiment of the invention. In this embodiment, a sleeve 80 is longer than the sleeve 46 of the first embodiment, and a flange 82 is located farther from the armature 40 than the counterpart of the first embodiment. The flange 82 is in the form of a disk and has three mounting portions 84 protruding integrally from a peripheral edge thereof and spaced at equal intervals in a circumferential direction thereof. Each mounting portion 84, which is rectangular in shape, extends radially outward from the flange 82 and has a proximal end twisted so as to be inclined with respect to the flange 82 and the armature 40. Also, three rubber vibration isolators 86 are attached to the flange 82 at locations between respective adjacent mounting portions 84 and are disposed in contact with the armature 40 to prevent vibrations thereof.

Further, in this embodiment, leaf springs 88 are flat and rectangular in shape and are inclined as a whole to the outer surface of the armature 40. Each leaf spring 88 has an inner end portion 90 secured to the outer surface of the corresponding mounting portion 84 in close contact therewith via engaging means. The engaging means includes a circular protuberance 92 formed on the outer surface of the mounting portion 84 and having a diameter enlarged by caulking, and a through hole 94 formed in the inner end portion of the leaf spring 88 and fitted around the protuberance 92. Also, each leaf spring 88 has an outer end portion 96 connected to the armature 40 by engaging means. This engaging means includes a thick portion 98 of the armature 40 corresponding in position to the outer end 96, and a groove 100 obliquely cut into the thick portion 98. The outer end portion 96 of each leaf spring 88 is inserted into the corresponding groove 100, whereby the leaf springs 88 are engaged at their respective outer ends 96 with the armature 40. Thus, in this embodiment, the inclination angle α of the leaf springs 88 is determined by the angle of inclination of the mounting portions 84 and the grooves 100.

Also in the electromagnetic clutch of the third embodiment, the boost force is produced due to the orientation of the leaf springs 88. In this embodiment, however, the radial positions of the inner and outer ends 90 and 96 of each leaf spring 88 are closer to each other than in the case of the first embodiment, and thus the intersection angle θ is small. In order to obtain large boost force, therefore, the inclination angle α needs to be increased.

On the other hand, in this embodiment, the outer end 96 of each leaf spring 88 is simply inserted into the corresponding groove 100 while the inner end 90 is connected to the corresponding protuberance 92 by caulking via the through hole 94. It is therefore unnecessary to use fastening members such as the rivets 50 and the short rivets 66.

Figure 8:
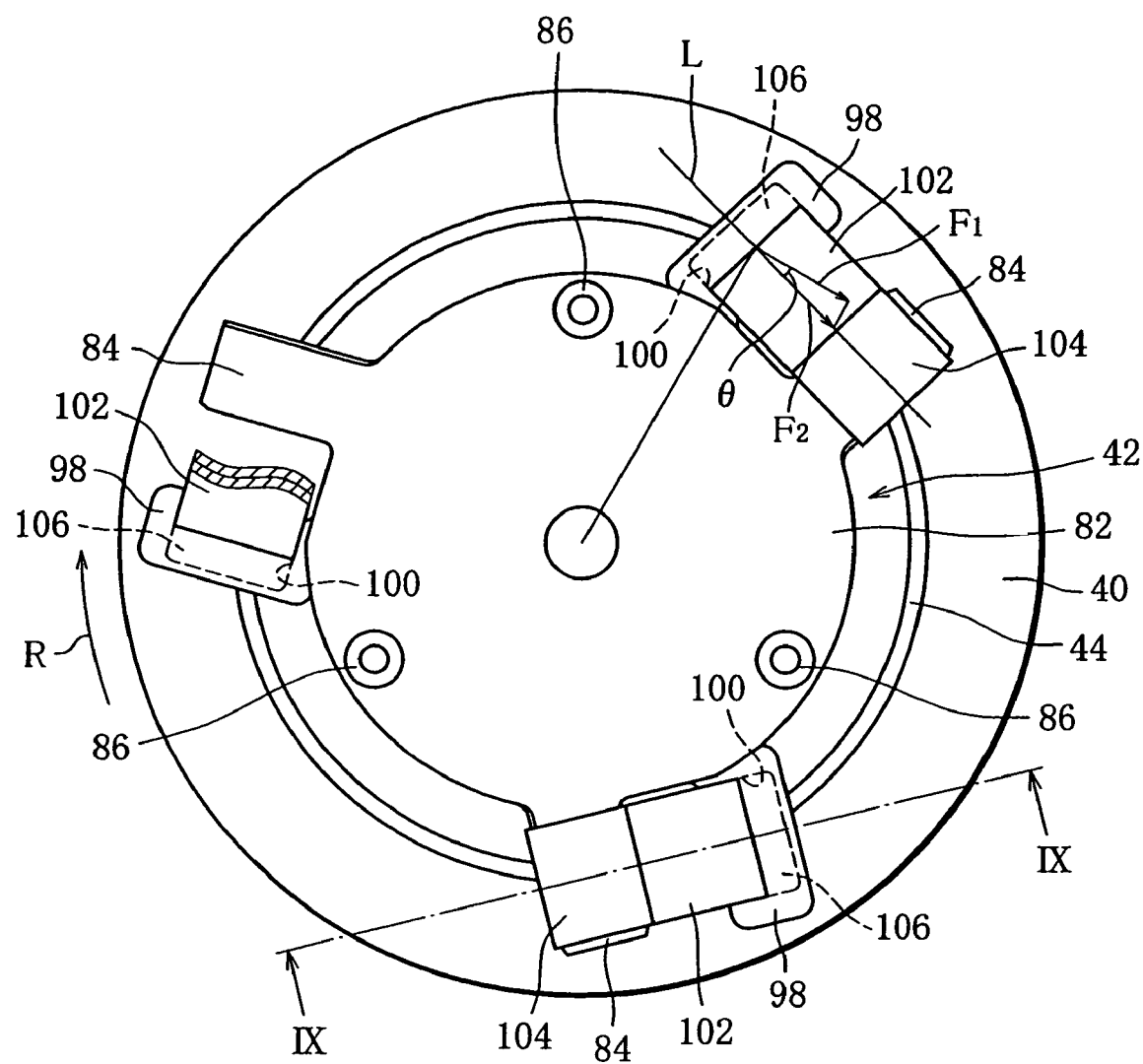
FIG. 8 is a front view of a coupler used in an electromagnetic clutch of a fourth embodiment, showing a state of the coupler coupled to the armature.
Figure 9:
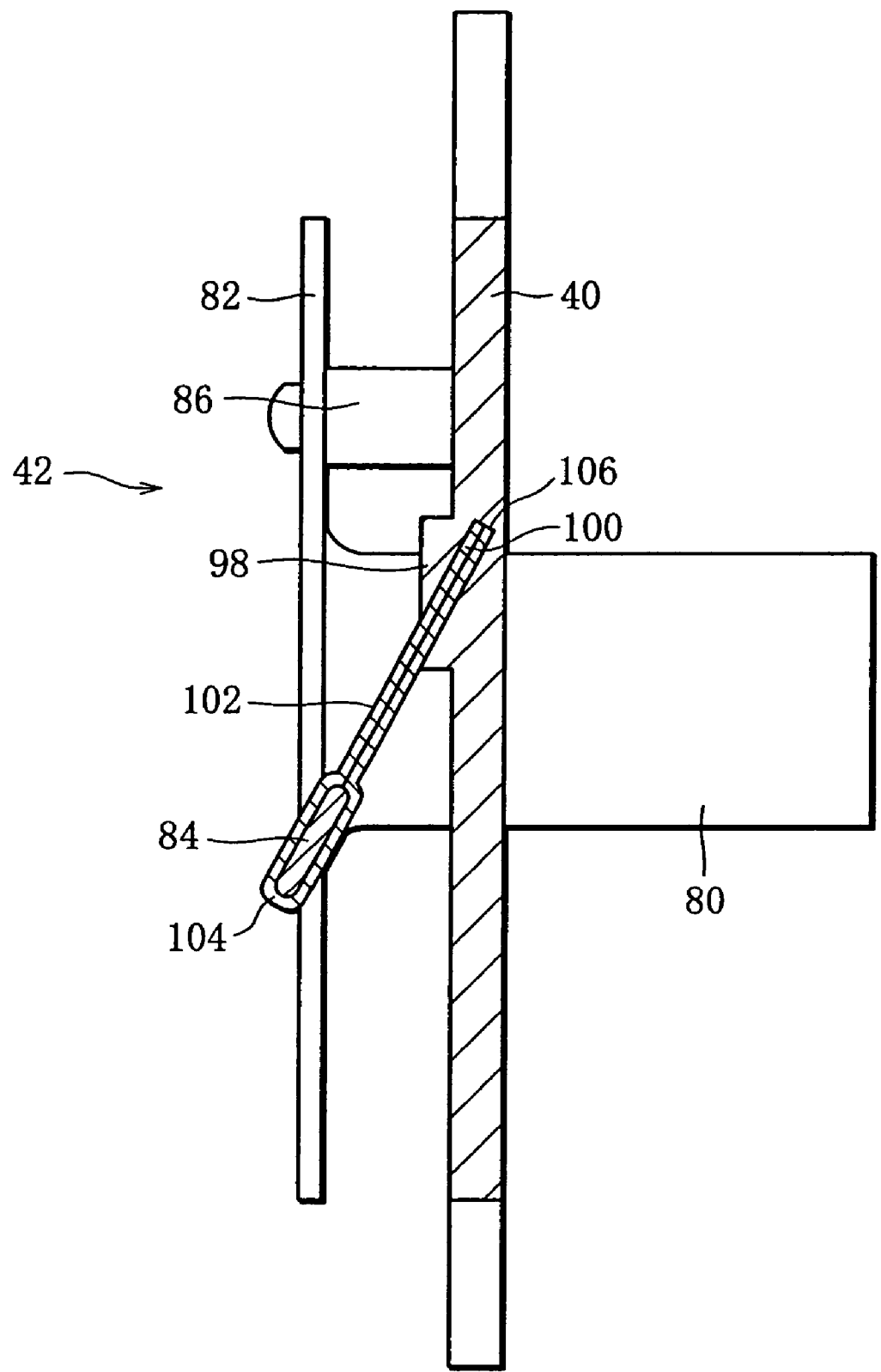
FIG. 9 is a sectional view taken along line IX-IX in FIG. 8.

FIGS. 8 and 9 illustrate a fourth embodiment of the invention. In the figures, identical reference numerals are used to denote elements identical with those of the third embodiment, and description of such elements is omitted.

In this embodiment, each leaf spring 102 is bent or folded at an inner end 104 thereof, thus forming a double leaf spring. The folded inner end portion 104 clamps the corresponding mounting portion 84 therein to be connected to the flange 82. Each leaf spring 102 has a double outer end 106 which is inserted into the corresponding groove 100, as in the third embodiment.

In the electromagnetic clutch of the fourth embodiment, the outer end 106 of each leaf spring 102 is simply inserted into the corresponding groove 100 while the inner end 104 clamps the corresponding mounting portion 84 therein. It is therefore unnecessary to use fastening members such as the rivets 50 and the short rivets 66.

Figure 10:
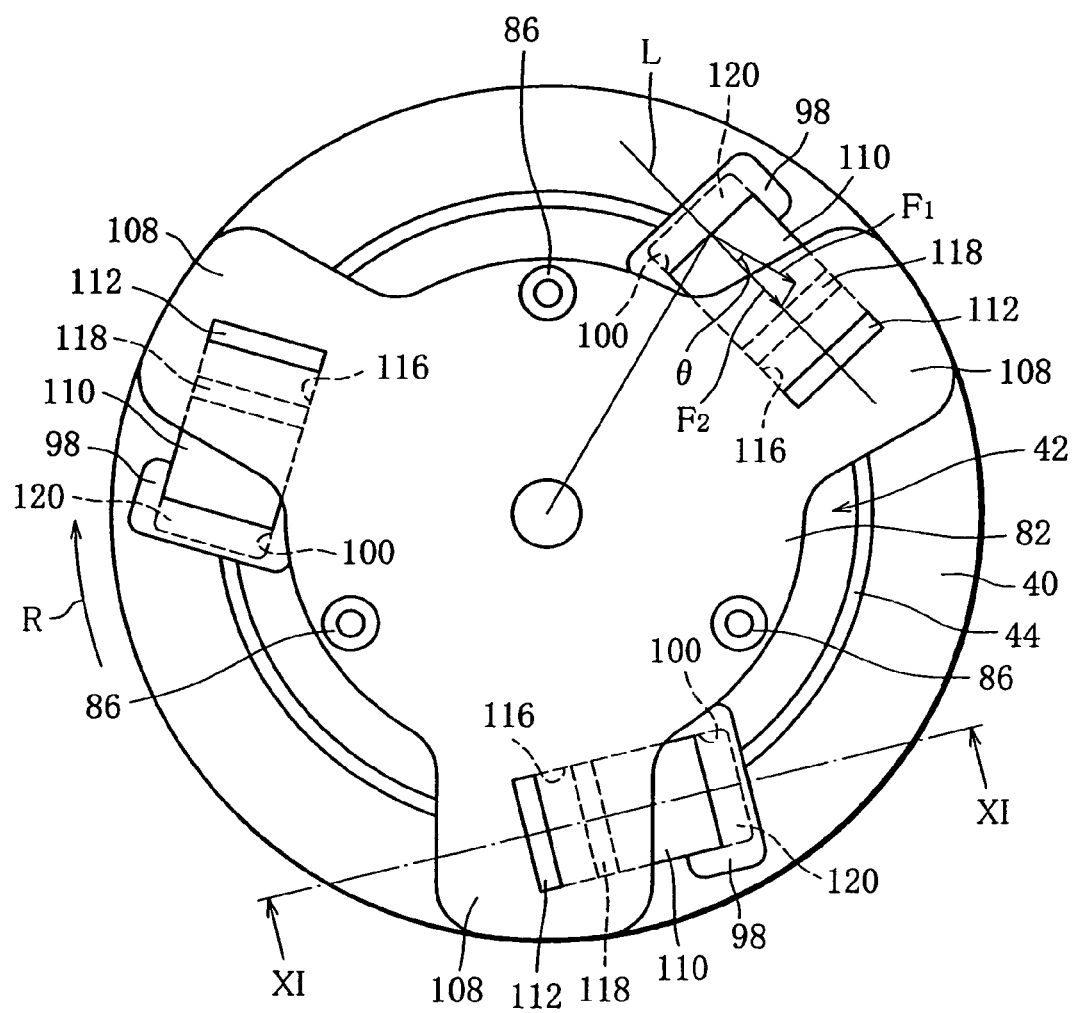
FIG. 10 is a front view of a coupler used in an electromagnetic clutch of a fifth embodiment, showing a state of the coupler coupled to the armature.
Figure 11:
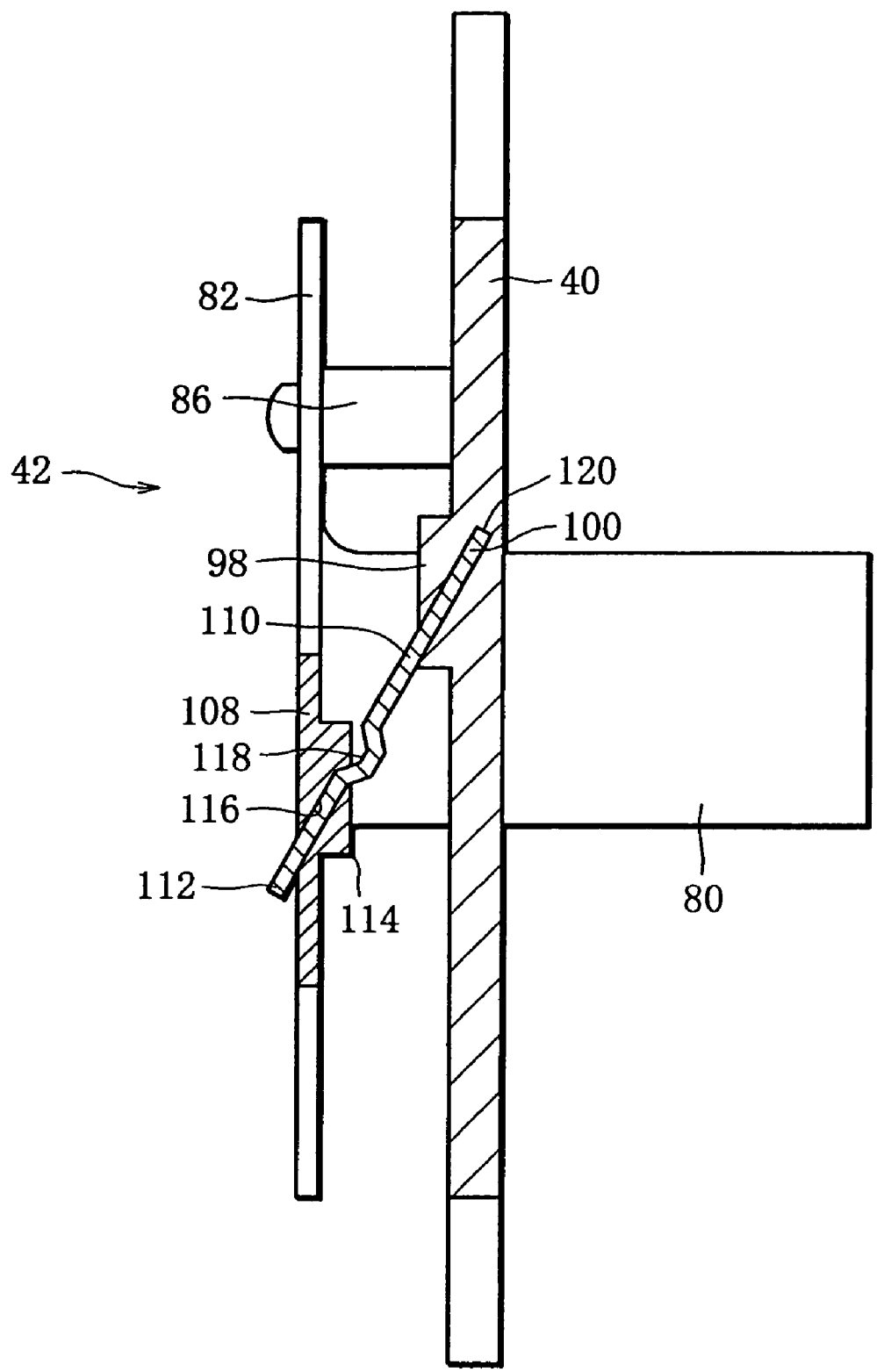
FIG. 11 is a sectional view taken along line XI-XI in FIG. 10.

FIGS. 10 and 11 illustrate a fifth embodiment of the invention. In the figures, identical reference numerals are used to denote elements identical with those of the third embodiment, and description of such elements is omitted.

In this embodiment, mounting portions 108 have a width greater than that of the mounting portions 84 of the third embodiment and extend parallel with the flange 82 and the armature 40. Each mounting portion 108 has a thick portion 114 corresponding in position to the inner end 112 of a leaf spring 110, and an oblique slit 116 is cut through the thick portion 114. The inner end 112 of each leaf spring 110 is inserted through the corresponding slit 116 and fixed to the flange 82. The leaf spring 110 has a stepped portion 118 for limiting the length by which the inner end portion 112 can be inserted, and the stepped portion 118 adjoins the opening of the slit 116.

In the electromagnetic clutch of the fifth embodiment, the inner end 112 of each leaf spring 110 is simply inserted through the corresponding slit 116 and also the outer end 120 is inserted into the corresponding groove 100. It is therefore unnecessary to use fastening members such as the rivets 50 and the short rivets 66.

The invention claimed is:

1. An electromagnetic clutch capable of connecting and disconnecting a driving power source and a rotary shaft, comprising:
   a rotor arranged around the rotary shaft coaxially therewith and adapted to be rotated by the driving power source;
   an electromagnetic force generator including an electromagnetic coil arranged inside the rotor, the electromagnetic force generator producing an electromagnetic force when the electromagnetic coil is energized;

an armature arranged close to the rotor and capable of being attracted to the rotor by the electromagnetic force to produce a transmission force transmitted from the rotor to the rotary shaft; and a coupler coupling the armature and the rotary shaft to each other, the coupler including a connecting member coupled to the rotary shaft, and leaf springs coupling the connecting member and the armature to each other and urging the armature in such a direction as to separate the armature from the rotor, wherein each of the leaf springs has a portion inclined with respect to the armature, the inclined portion being inclined at an angle falling within a range in which the armature is separable from the rotor when the electromagnetic coil is de-energized during rotation of the armature together with the rotor, and the connecting member has mounting portions to which inner ends of the respective leaf springs are attached, each of the mounting portions being inclined at an angle corresponding to the angle of inclination of the leaf springs, and wherein each of the leaf springs has inner and outer ends as viewed in a radial direction of the armature, the inner end of each of the leaf springs is located more forward than the outer end, as viewed in a rotating direction of the armature, and separated farther from the armature than the outer end, and the inner end of each of the leaf springs is formed as a folded portion, the folded portion clamping the corresponding mounting portion therein, and wherein the leaf springs each assume an orientation such that a boost force assisting an attractive force acting on the armature is produced based on the transmission force when the armature is attracted to the rotor.

2. The electromagnetic clutch according to claim 1, wherein the armature has fixing holes into which the outer ends of the respective leaf springs are inserted.

* * * * *